Nov. 10, 1925.

P. NICHOLAS 1,561,350

CANDY MIXING MACHINE

Filed June 14, 1924     3 Sheets-Sheet 1

Peter Nicholas
INVENTOR

BY Victor J. Evans
ATTORNEY

WITNESS:

Nov. 10, 1925.

P. NICHOLAS

CANDY MIXING MACHINE

Filed June 14, 1924

Peter Nicholas
INVENTOR
BY Victor J. Evans
ATTORNEY

WITNESS:

Nov. 10, 1925.
P. NICHOLAS
1,561,350
CANDY MIXING MACHINE
Filed June 14, 1924
3 Sheets-Sheet 3

Peter Nicholas
INVENTOR

Patented Nov. 10, 1925.

1,561,350

UNITED STATES PATENT OFFICE.

PETER NICHOLAS, OF MEDICINE HAT, ALBERTA, CANADA.

CANDY-MIXING MACHINE.

Application filed June 14, 1924. Serial No. 720,052.

*To all whom it may concern:*

Be it known that I, PETER NICHOLAS, a citizen of the United States, residing at Medicine Hat, in the Province of Alberta and Dominion of Canada, have invented new and useful Improvements in Candy-Mixing Machines, of which the following is a specification.

This invention relates to apparatus for use by confectioners, bakers and the like and has for its object the provision of a novel machine designed for use in beating creams, marshmallow, fondants, and the like in the manufacture of candy, and also capable of use in beating cake batter and mixing doughs in the manufacture of cakes, bread and the like.

An important and more specific object is the provision of a machine for this purpose which is power driven and which is therefore capable of having a large output so that the manufacturer of the goods specified will be simplified.

Another object is the provision of a mechanism of this character embodying a power driven agitator and interchangeable beaters and receptacles so that different materials may be mixed, stirred or beaten.

An additional object is the provision of a mixing machine which will be simple and inexpensive in manufacture, rapid in use, positive in action, efficient and durable in service and a general improvement in the art.

With the above and other objects and advantages in view the invention consists in the details of construction to be hereinafter more fully described and claimed and illustrated in the accompanying drawings, in which:

Figure 1:
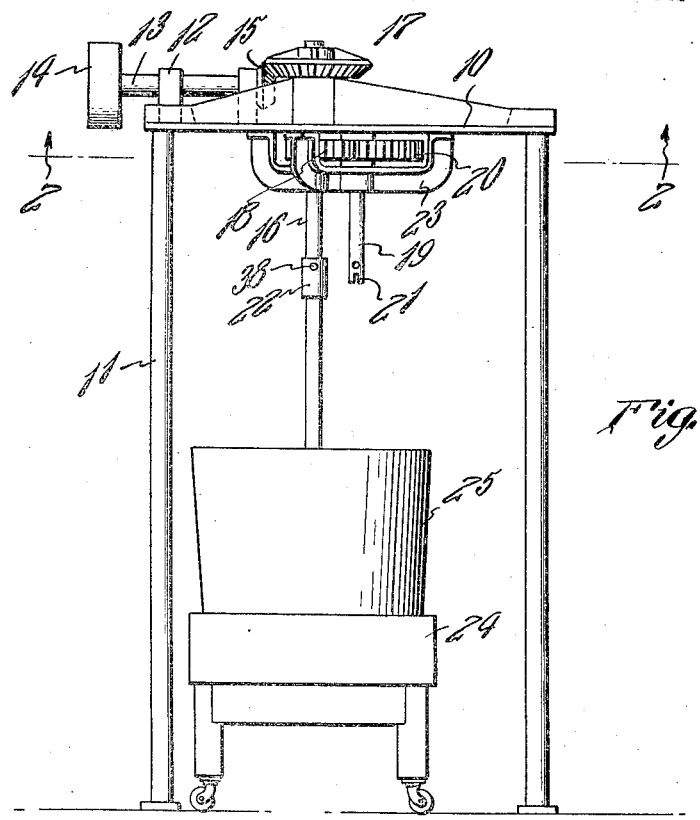
Figure 1 is a side elevation of the device.
Figure 2:
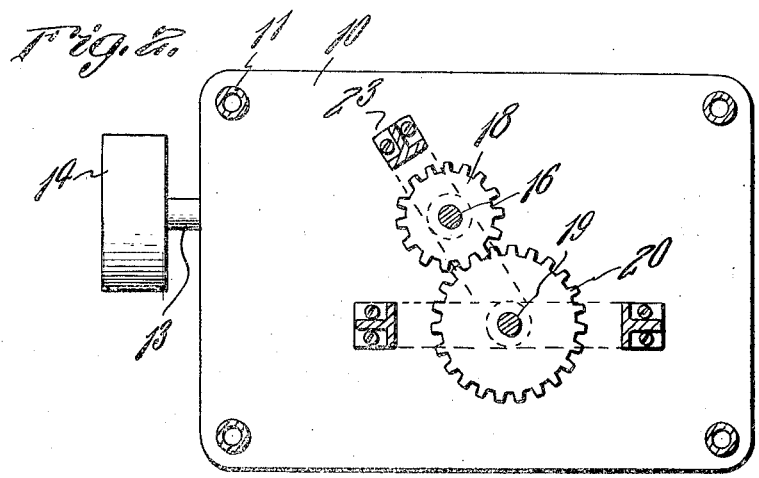
Figure 2 is a section on the line 2—2 of Figure 1 looking upwardly.
Figure 3:
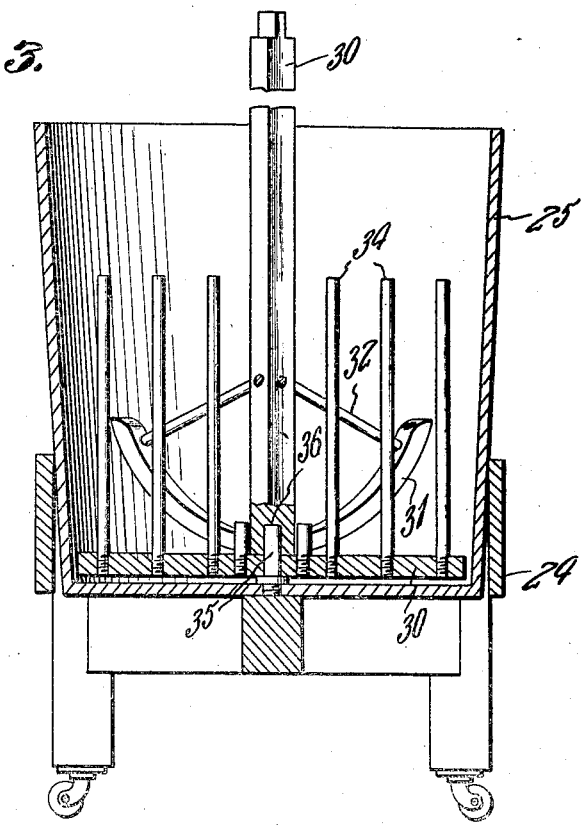
Figure 3 is a longitudinal section through one form of receptacle and beater.
Figure 4:
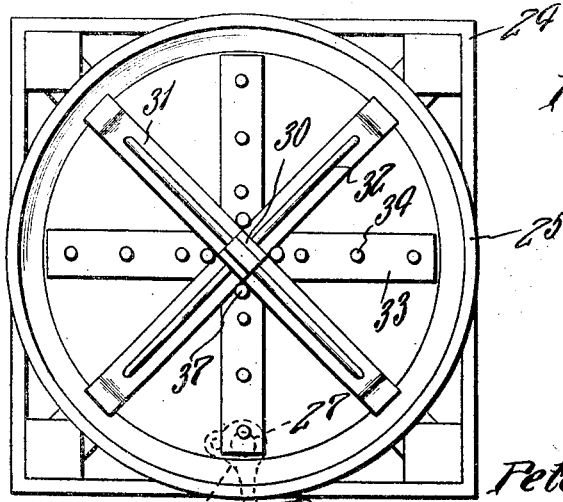
Figure 4 is a plan view thereof.
Figure 5:
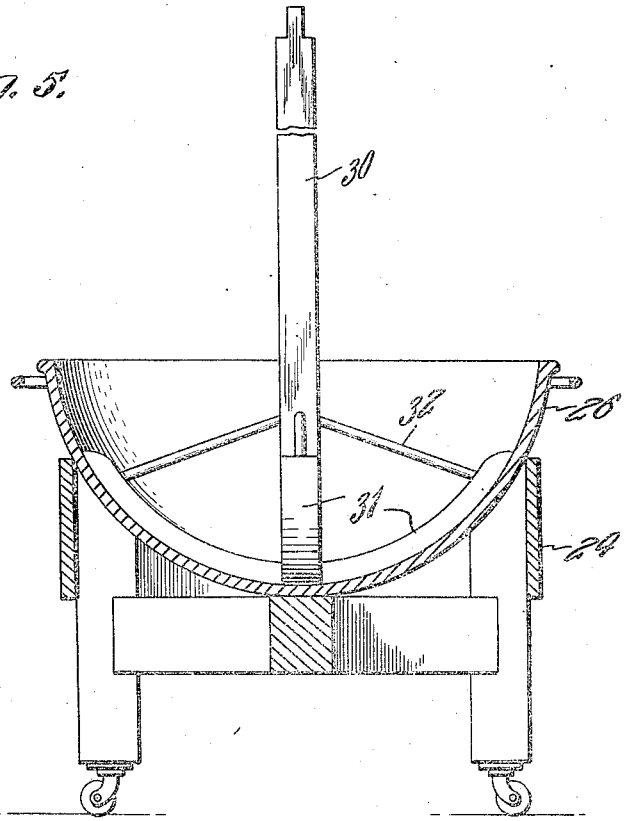
Figure 5 is a longitudinal section through a different form of receptacle and beater and Figure 6 is a plan view thereof.
Figure 6:
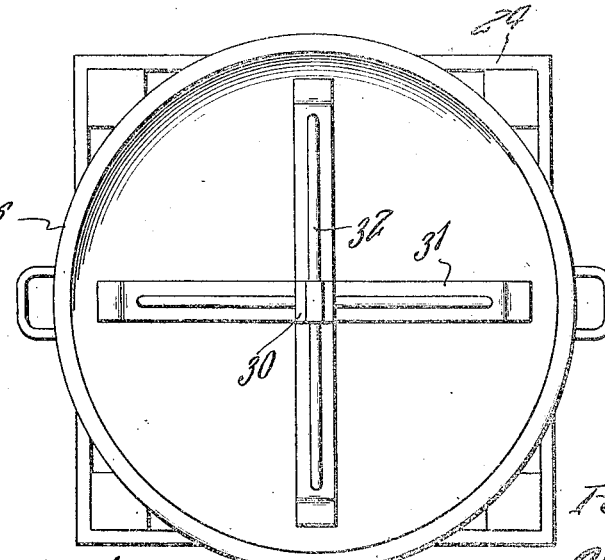

Referring more particularly to the drawings I have shown the device as comprising a head member 10 supported by uprights 11 located at the corners thereof, which uprights are intended to be mounted upon the floor in any suitable manner so as to be rigid and substantial. On this head 10, which is in the nature of a plate and which may be a casting, are bearings 12 for a shaft 13 carrying a pulley 14 designed to be driven by any suitable power device. This shaft carries a bevel gear 15. Journaled through the plate is a shaft 16 provided at its upper end with a bevel gear 17 meshing with the gear 15 and carrying, at its intermediate portion a spur gear 18. Also journaled through the head or plate is a shaft 19, carrying a relatively large gear 20 meshing with the small gear 18. The shafts 16 and 19 are prolonged downwardly and have their lower ends forked at 21 and carrying movably mounted sleeves 22. On the underside of the plate or head member 10 is a bracket 23 which supports the shafts and which prevents longitudinal movement thereof.

In connection with the above described mechanism, I make use of a wheeled truck 24 designed to carry a receptacle 25 of a tub like nature or a kettle like receptacle 26 depending upon the nature of the material to be beaten. The receptacle 25 is of cylindrical shape with a slight taper and at the bottom thereof is a discharge hole 27 normally closed by a knife or plate valve 28 having a handle 29.

The agitating means for the material in the receptacle 25 consists of an elongated bar 30 provided at its lower end with arcuate shoes 31 which have their free ends braced with respect to the bar by inclined rods 32. In the bottom of the receptacle is an agitating member including crossed arms 33 from which rise rods 34. The agitating members are mounted centrally within the receptacle upon an upstanding trunnion 35 which projects upwardly from the bottom of the receptacle and which is engaged within a suitable socket 36 in the lower end of the bar 30. I also provide upstanding pins 37 which rise from the crossed arms and which engage within the angles of the crossed shoes 31 so that the two agitating members must move in unison.

In the operation the tub is placed upon the truck and the material to be beaten is placed into the tub, the agitating members being of course in position. The truck is then wheeled into the space between the uprights 11 and the upper end of the bar 30 is engaged within the fork 21 at the lower end of the shaft 16, the sleeve 22 being slid over the joint and fastened by a pin 38 or the like whereby to prevent separation of the parts. When power is applied to the pulley 14 the gearing will operate to rotate the agitating devices so that the material may be properly beaten. When the mixing or beating is completed the operator swings the handle 29 to uncover the opening 27 so that the contents of the tub may flow into a suitable receptacle.

In mixing certain other materials the kettle like receptacle 26 is used. In this instance the agitating member formed by the arms 33 and 34 is not used and only the agitating member including the bar 30 and shoes 31 is employed, this member being pivotally mounted at the center of the kettle by being engaged upon a trunnion 39 rising from the bottom thereof. In this instance the upper end of the bar 30 is engaged with the fork in the lower end of the shaft 19 in case it is desired that the material be beaten or mixed at a comparatively low speed, it being obvious that the shaft 19 rotates much more slowly than the shaft 16, though of course it should be understood that if desired for any reason either form of agitating devices and receptacle may be used with either shaft, all depending upon whether or not rapid mixing or beating is desired or possible this being governed by the material and its purpose.

From the foregoing description and a study of the drawings it will be apparent that I have thus provided a simply constructed, inexpensive and highly efficient mixing or beating device which is capable of use for a wide variety of purposes and which may be made in any desired size depending upon the intended capacity. As there are so few parts, it is apparent that there is very little to get out of order so that the device should have a long life and satisfactorily perform all of its functions.

While I have shown and described the preferred embodiment of the invention it is of course to be understood that I reserve the right to make such changes in the form, construction and arrangement of parts as will not depart from the spirit of the invention or the scope of the subjoined claims.

Having thus described my invention I claim:

1. In an agitating device, a receptacle provided at the center of its bottom with an upstanding trunnion, and agitating means including a member formed of crossed arms carrying upstanding rods and formed centrally with a hole engaged upon said trunnion and an elongated shank adapted to be driven and carrying arcuate shoes arranged in crossed relation above said crossed arms, the lower end of the shank being formed with a socket rotatably engaged upon said trunnion.

2. In a device of the character described, a receptacle provided centrally of its bottom with an upstanding bearing member, and agitating means including a member formed of arms arranged in intersecting relation and journally engaged with said bearing member, upstanding rods carried by said arms, an elongated shank member journaled centrally of said arms and carrying arcuate shoes arranged in intersecting relation about said arms.

3. In a device of the character described, a receptacle provided centrally of its bottom with an upstanding trunnion, and agitating means located within the receptacle and including a lower member formed of arms arranged in cross relation journally engaged upon said trunnion and carrying spaced parallel upstanding rods, and a shank having a bearing portion rotatably engaged about the trunnion and carrying arcuate shoes arranged in cross relation and located above said arms.

In testimony whereof I affix my signature.

PETER NICHOLAS.